(12) United States Patent
Kozora

(10) Patent No.: US 6,907,754 B2
(45) Date of Patent: Jun. 21, 2005

(54) SELF-ALIGNING IMPACT TOLERANT I.S. MACHINE CARTRIDGE ASSEMBLY

(76) Inventor: Joseph W. Kozora, 126 Whitaker La., Saxonburg, PA (US) 16056

( * ) Notice: Subject to any disclaimer, the term of this patent is extended or adjusted under 35 U.S.C. 154(b) by 416 days.

(21) Appl. No.: 10/281,877

(22) Filed: Oct. 28, 2002

(65) Prior Publication Data
US 2004/0079116 A1 Apr. 29, 2004

(51) Int. Cl.[7] ............................................. C03B 11/06
(52) U.S. Cl. .............................. 65/172; 65/171; 65/362
(58) Field of Search ........................... 65/171, 172, 173, 65/305, 307, 321, 323, 326

(56) References Cited

U.S. PATENT DOCUMENTS

| | | | |
|---|---|---|---|
| 3,305,344 A | | 2/1967 | Colchagoff .................. 65/357 |
| 4,094,656 A | * | 6/1978 | Colchagoff et al. ............ 65/81 |
| 4,137,061 A | * | 1/1979 | Mallory et al. ............... 65/232 |
| 4,191,548 A | * | 3/1980 | Fortner et al. ................ 65/79 |
| 4,585,467 A | * | 4/1986 | Trahan et al. ................. 65/172 |
| 5,358,543 A | | 10/1994 | Kozora ........................ 65/319 |
| 5,411,564 A | | 5/1995 | Bolin ............................ 65/68 |
| 6,497,120 B1 | | 12/2002 | Kozora ........................ 65/362 |

* cited by examiner

Primary Examiner—Sean Vincent
(74) Attorney, Agent, or Firm—The Webb Law Firm

(57) ABSTRACT

A cartridge assembly for a blow-and-blow parison-forming machine comprises a cylindrical barrel, an annular lower stop having a central opening for accepting a piston rod and having an upwardly opening tapered recess adjacent the central opening, an annular cylinder cap having a central opening for accepting a thimble and plunger and having a downwardly opening tapered recess adjacent the central opening. The lower stop, cylinder cap, and barrel form a unit. An annular floating piston is arranged to reciprocate within the cylindrical barrel. The floating piston has a lower tapered end for at the lowermost position of the floating piston resting in the upwardly opening tapered recess in the lower stop and an upper tapered end for at the uppermost position of the floating piston resting in the downwardly opening tapered recess in the cylinder cap.

10 Claims, 4 Drawing Sheets

SELF-ALIGNING IMPACT TOLERANT I.S. MACHINE CARTRIDGE ASSEMBLY

BACKGROUND OF THE INVENTION

1. Field of the Invention

This invention is directed to the structure, known in the art as the cartridge assembly, for reciprocating the plunger used in forming parisons during the manufacture of glass containers with individual section (I.S.) machines.

2. Description of Related Art

A well-established process for manufacturing glass containers is known as the "blow-and-blow" process. In the "blow-and-blow" process, a gob of molten glass is introduced and partially shaped or molded into an object called a parison, which eventually will be formed into a glass container. The parison is formed by a blowing operation in a mold. The gob is introduced into the mold positioned over a plunger and neck ring which act together to form the neck region of the parison. Air pressure over the gob or a vacuum below the gob is provided to urge the gob into the neck and around the plunger. The plunger is then withdrawn creating a space into which air is blown to expand the gob to the shape of the mold cavity. Thereafter, the shaped gob or parison is transferred to a finishing mold for a further blowing operation to form the parison into a container.

The cartridge assembly must move the plunger and the thimble that slides over the plunger through three distinct positions; namely, "full-up", "blow", and "full-down" or retracted. In the full-up position, the thimble abuts the neck ring and the plunger is placed within the neck ring. In the blow position, the thimble remains abutting the neck ring but the plunger is partially withdrawn. In the full-down position, the thimble and plunger are moved clear of the neck ring so that the parison can be moved by an inverted arm to a container-forming station.

Various prior art cartridge assemblies for plunger and thimble cycling are disclosed, for example, in Colchagoff U.S. Pat. No. 3,305,344 entitled "Neck Mold and Plunger Unit for Glass Forming Apparatus", Kozora U.S. Pat. No. 5,358,543 entitled "Air Tube Structure in a Glass Container Forming Machine" and Bolin U.S. Pat. No. 5,411,564 entitled "Pneumatic Plunger Mechanism for a Glassware Forming Machine."

The Colchagoff patent discloses a cartridge assembly that moves the plunger and thimble with two separate single-acting, spring-biased pneumatic cylinders. The Kozora patent discloses a cartridge assembly with a single pneumatic piston and large and small springs for separately biasing the thimble and plunger in a well-known lost motion arrangement. When the plunger and neck ring are in the full-up position, the large spring is partially expanded and the small spring is compressed. Both springs hold the plunger and thimble in their upwardmost positions. As the plunger is drawn down to the blow position, the large spring is compressed but the small spring expands to maintain the thimble against the neck ring. As the piston is drawn down further, the thimble is captured and pulled down along with the plunger.

The main problem with single acting pneumatic pistons and return springs in cartridge assemblies is that there exists the tendency for a repeated hammering effect between the mechanical components which can and do lead to failure of various mechanical components. In particular, the floating piston actuated by the large spring bangs against the cylinder cap each time the plunger and neck ring are raised to the full-up position. Further, the repeated movement of the springs and the associated machine elements results in fatigue and wear of those components, especially if they tend to wobble during reciprocation.

The Bolis patent is directed to overcoming the hammering effect by elimination of springs altogether. The Bolis patent discloses a cartridge assembly that moves the plunger and thimble with two double acting pneumatic cylinders. However, the backward compatibility of the Bolis patent is limited by the need for controlling the pneumatic pressure in three, not just one, pneumatic pistons. Moreover, numerous parts exterior to the cartridge assembly would have to be replaced in the existing fleet of I.S. machines.

SUMMARY OF THE INVENTION

It is an advantage of the present invention disclosed herein that the hammering effect and wear problems of prior spring-actuated cartridge assemblies is overcome with the replacement of relatively few parts and the addition of several others. All of the additions and substitutions take place within the existing cartridge assembly and there is no need to modify parts outside of the cartridge assembly.

It is a further advantage of the present invention disclosed herein to provide a self-contained cartridge assembly that can be serviced and assembled with replaceable spacers in one location and then carried onto the production floor and dropped into place over the pneumatic cylinder assembly.

Briefly, according to one aspect of the present invention, there is provided a cartridge assembly for a blow-and-blow parison-forming machine that comprises a cylindrical barrel, an annular lower stop, and an annular cylinder cap. The lower stop has a central opening, an upwardly opening tapered recess adjacent the central opening, and a first upwardly facing circular surface near the periphery of the lower stop. The annular cylinder cap has a central opening and has a downwardly opening tapered recess adjacent the central opening. The lower stop, cylinder cap, and barrel form a unit with the annular stop at the lower axial end of the barrel and the cylinder cap at the upper axial end of the barrel. A first coil spring rests on the first upwardly facing circular surface in the lower stop. An annular floating piston having a central bore is arranged to reciprocate within the barrel. The floating piston has a lower tapered end for, at the lowermost position of the floating piston, resting in the upwardly opening tapered recess in the lower stop, and an upper tapered end for, at the uppermost position of the floating piston, resting in the downwardly opening tapered recess in the cylinder cap. The floating piston has an annular flange defining a first downwardly facing circular surface against which the upper end of the large coil spring rests. An annular lock spring piston has a cylindrical periphery slidable within said floating piston and an upwardly facing circular surface near the periphery thereof. A second coil spring rests on the upwardly facing circular surface in the lock spring piston. An annular thimble lock has an exterior surface for sliding within the floating piston, an upwardly facing surface for abutting the thimble, and a downwardly facing circular surface for receiving the upper end of the second coil spring.

BRIEF DESCRIPTION OF THE DRAWINGS

Further features and other objects and advantages will be understood from the following detailed description made with reference to the drawings in which.

DESCRIPTION OF THE PREFERRED EMBODIMENTS

Figure 1:
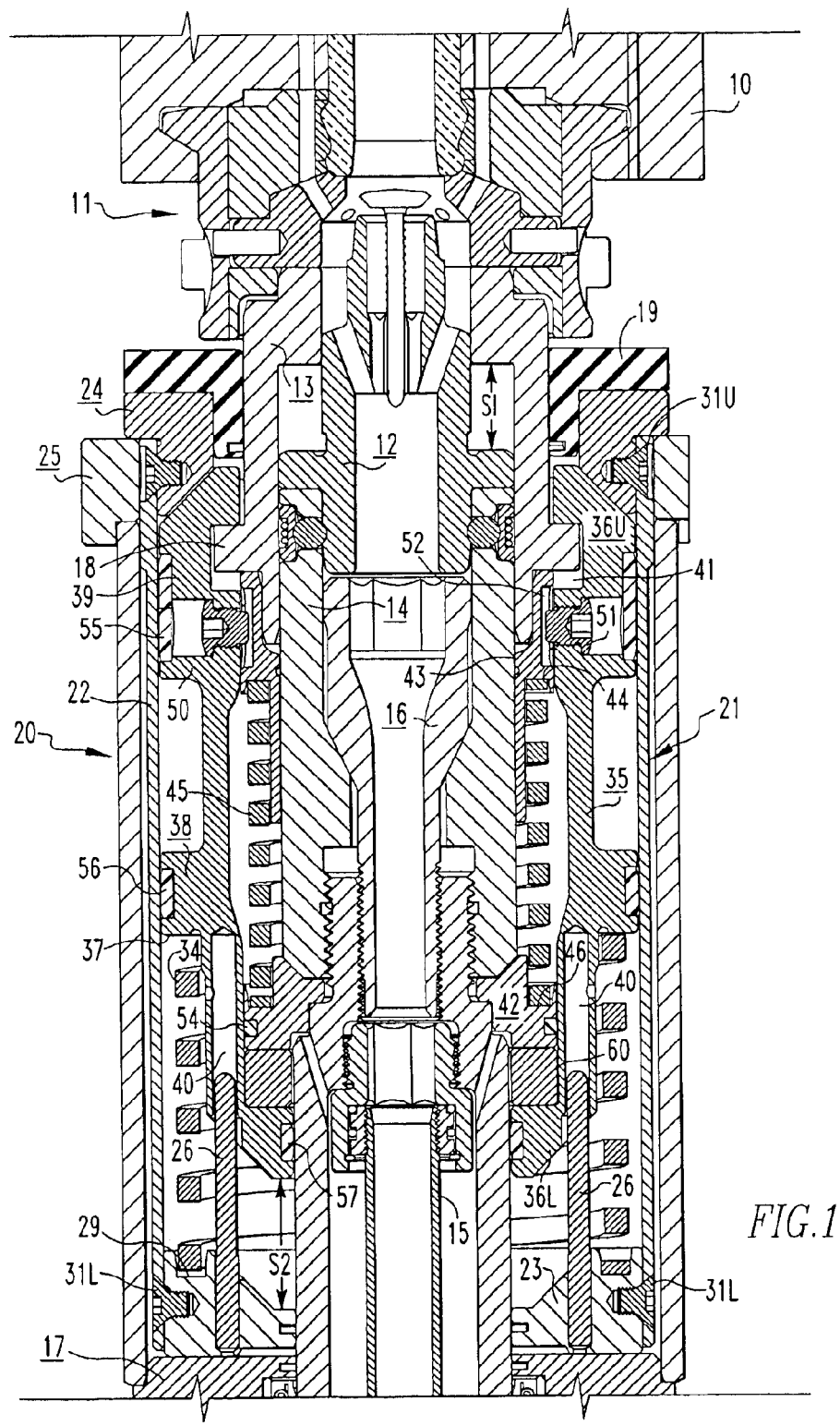
FIG. 1 is a section view through the lower portion of a neck mold, a neck ring, and the cartridge assembly according to the present invention.
Figure 2:
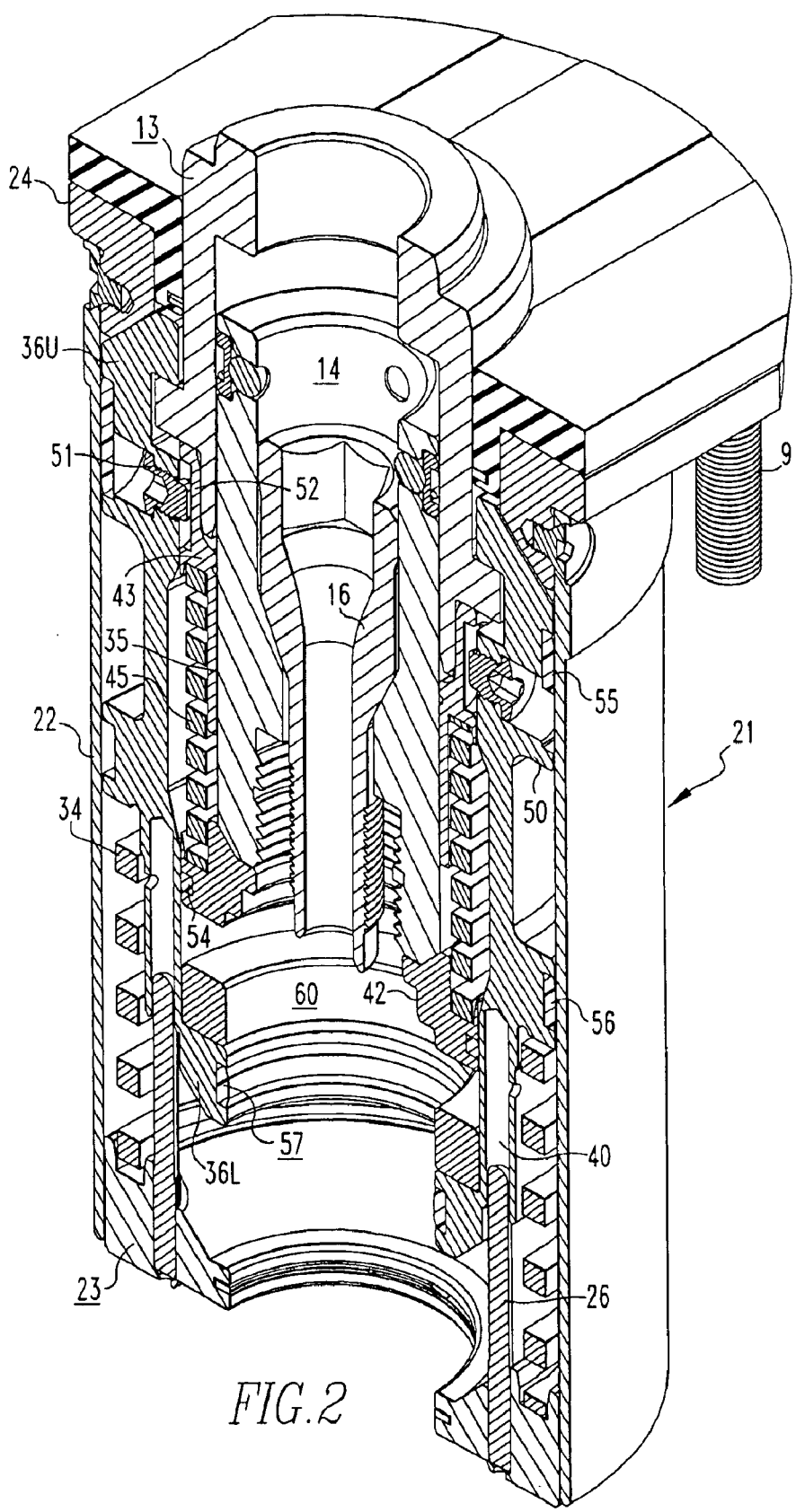
FIG. 2 is a sectioned perspective view of a cartridge assembly according to the present invention associated with a standard adapter and locking stud.
Figure 3:
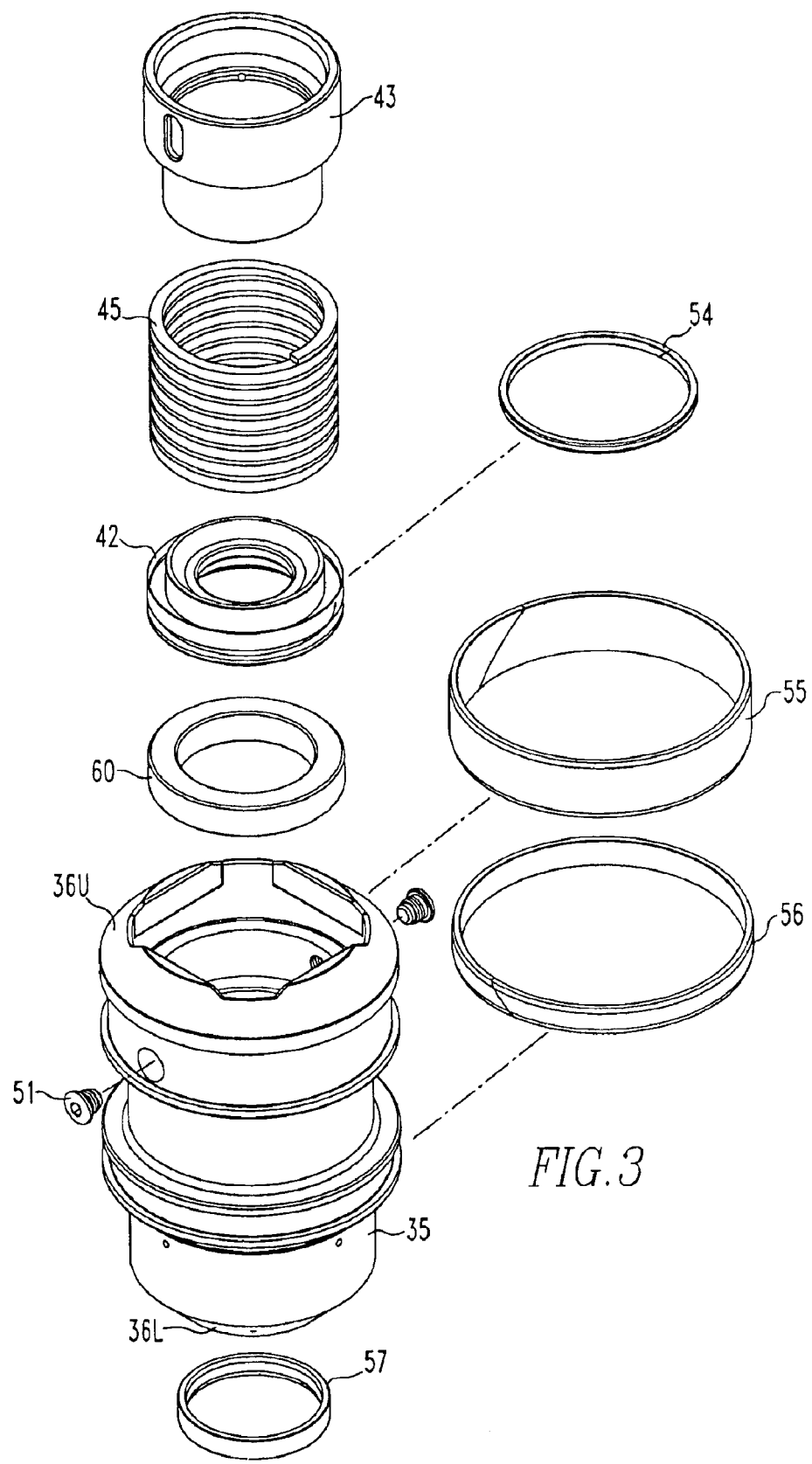
FIG. 3 is an exploded view of the parts of the cartridge directly associated with the floating piston.
Figure 4:
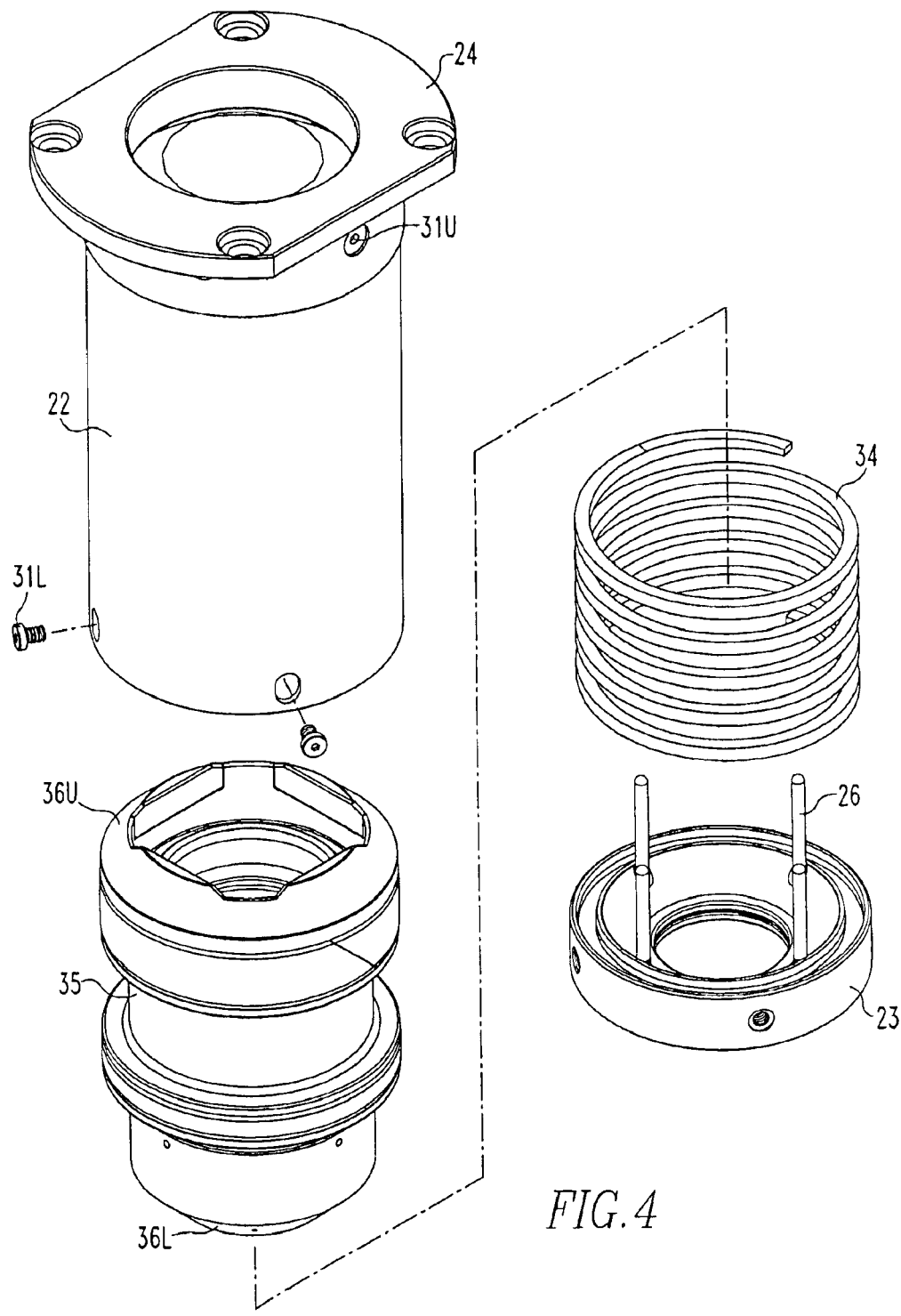
FIG. 4 is an exploded view in perspective of the cartridge, the floating piston, and the large spring for biasing the floating piston.

With reference to FIG. 1, the relationship of a plunger cylinder assembly 20 to associated machine elements will be explained. A blank or parison mold 10 is positioned over a neck ring 11. A cylinder assembly moves a plunger 12 in and out of the opening in the neck ring. An element known in the art as a thimble 13 slides over the plunger 12 and moves up and down independently of the plunger 12 to abut the bottom of the neck ring 11 during certain stages of the parison forming process. The function of the plunger cylinder assembly 20 is principally to position the plunger 12 and thimble 13 in one of three positions; namely, "full-up", "blow", and "full-down".

The plunger 12 in the "full-up" position enters the neck ring 11 for the formation of the neck of the parison as a gob of molten glass flows into the space between the neck ring 11 and the upper end or nose of the plunger 12. At this position, the thimble 13, which slides outside of the plunger 12, bears upon the underside of the neck ring I1. In this position, a vacuum may be pulled through passages in the plunger 12 and neck ring 11 on the neck and lower end of the parison mold 10 to draw the gob into the neck and mold. The neck ring 11 often is configured to form threads on the exterior of the neck of the parison and container.

The plunger 12 in the "blow" position (as shown in FIG. 1) is partially withdrawn from the neck ring 11 leaving a space or bubble in the bottom of the gob into which air may be forced to blow the gob into contact with the walls of the mold forming the parison. The plunger 12 in the "full-down" position is moved further away from the neck ring 11 and the thimble 13 is also pulled back away from the neck ring 11. The plunger 12 may take many different configurations. The plunger 12 illustrated in FIG. 1 is described in detail in a copending U.S. patent application filed of even date herewith entitled "Plunger for Bottle Forming I.S. Machine".

The plunger 12 is held in an adapter 14 that, in turn, is threaded to a hollow piston rod 15 and is further secured by a locking stud 16. A pneumatic cylinder (not shown) over which the plunger cylinder assembly 20 is mounted pneumatically moves the hollow piston rod 15. The details of a suitable pneumatic cylinder are disclosed, for example, in Kozora U.S. Pat. No. 5,358,543 entitled "Air Tube Structure in a Glass Container Forming Machine". The details of the adapter 14 shown in the drawings are described in allowed Kozora U.S. patent application Ser. No. 09/713,724 entitled "Quick Change Connector for Plunger for Glass Container Forming Process and Equipment". Traditional connectors between the plunger and piston, such as removable clamps, are also suitable structures for attaching the plunger to the adapter.

The particular configurations of the parison mold 10, neck ring 11, plunger 12, adapter 14, hollow piston rod 15, and pneumatic cylinder that drives the hollow piston rod 15 form no part the invention claimed herein. However, the plunger cylinder assembly 20 now to be described interacts with these elements.

Referring to FIGS. 1 to 4, the working elements of a plunger cylinder assembly 20 according to the present invention are contained in a cartridge 21 comprised of a cylindrical barrel 22, a lower stop 23, and a cylinder cap 24. The various elements described herein are fabricated from steel, unless otherwise described. The lower stop 23 sits upon the intermediate cap 17 secured to the pneumatic cylinder. The cartridge 21 is held in place by a bolt 9 (see FIG. 2) between the cylinder cap 24 and the deflection ring 25 which, in turn, is held by hold down rods (not shown) extending to a saddle assembly in which the pneumatic cylinder rests. The deflection ring 25, hold-down rods, and saddle assembly are standard in the art.

The lower stop 23 has an annular shape with a central opening for accepting a piston rod 15 and having an upwardly opening tapered recess adjacent the central opening. The lower stop 23 has an upwardly facing circular surface near the periphery of the lower stop 23, which is preferably at the bottom of a circular groove 29. The cylinder cap 24 has an annular shape with a central opening for accepting the thimble 13 and plunger 12. The cylinder cap 24 has a downwardly opening tapered recess adjacent the central opening. As will be explained, the optimum slope of the tapers in the tapered recesses is 45 degrees to the reciprocating axis of the plunger. Acceptable tapers range from 30 to 60 degrees from the reciprocating axis. The cylinder cap 24 and barrel 22 are secured together as a unit at the upper axial end of the barrel. Various means may be used to fasten them together including machine screws 31U, as shown in the drawings, or a spot weld, or even glue. The barrel snugly fits over the lower stop 23 and is secured, for example, by machine screws 31L. A removable dust cover 19 fits over the cylinder cap 24. Thus, the cartridge 21 can be transported as a unit.

An annular floating piston 35 has a central bore for receiving the thimble 13, plunger 12, adapter 14, and piston rod 15. The floating piston 35 is arranged to reciprocate within the barrel 22 and over the piston rod 15. A self-lubricated ring bushing 57 is held in an interior annular groove at the lower end of the floating piston 35 and rides over the outer cylindrical surface of the piston rod 15. The floating piston 35 has a first annular flange 38 axially spaced from and below a second annular flange 39. Both flanges hold a self-lubricating ring bushing 55, 56 that slidably abut the inside cylindrical surface of the barrel 22.

The floating piston 35 has a lower tapered end 36L for, at the lowermost position of the floating piston, resting in the upwardly opening tapered recess in the lower stop 23. It also has an upper tapered end 36U for, at the uppermost position of the floating piston, resting in the downwardly opening tapered recess in the cylinder cap 24. The tapered recesses and tapered ends preferably have conical surfaces. Generally speaking, the floating piston is a unitary structure having rotational symmetry about a central axis, as do most of the parts of the cartridge assembly. Prior art floating pistons (sometimes called main pistons) were two-piece structures bolted together requiring much thicker walls. The unitary structure enables a reduction in overall mass of the floating piston and, therefore, a reduction in the energy and momentum that needs to be dissipated at each end of its stroke.

The first annular flange 38 of the floating piston 35 defines a first downwardly facing circular surface 37. A large coil spring 34 is compressed between the upwardly facing circular surface at the bottom of groove 29 in the lower stop 23 and the circular surface 37 on the first annular flange 38.

An annular lock spring piston 42 has a central opening receiving the hollow piston rod 15. The lock spring piston 42 is captured between the piston rod 15 and adapter 14. Hence, the lock spring piston 42 moves up and down with the piston rod 15. The lock spring piston 42 has a cylindrical periphery slidable within the floating piston 35. Self-lubricating ring bushing 54 is held in a recess in the cylindrical periphery. The lock spring piston 42 has an upwardly facing circular surface near the periphery thereof. A second coil spring 45 rests at its lower end in the upwardly facing circular surface at the bottom of groove 46 in the lock spring piston 42.

An annular thimble lock 43 has and exterior surface for sliding within the floating piston 35, an upwardly facing surface for abutting the thimble 13, and a downwardly facing circular surface at the top of groove 44 for receiving the upper end of the spring 45.

Guide rods 26 secured in the lower stop 23 are parallel to the axis of the barrel 22. The floating piston 35 has parallel bores 40 therein for slidably receiving the guide rods 26. The function of the guide rods 26 is to prevent rotation of the floating piston 35 about its axis.

The coil springs 34, 45 have rectangular cross sections. This overcomes the tendency of the springs to spread out and rub adjacent parts.

The floating piston 35 has an annular interior groove 41 near the top end thereof. This groove 41 is sized and shaped to receive the annular skirt 18 comprised of, for example, four tabs that pass through axial slots (not shown) in the floating piston 35 and enter the interior groove 41 upon rotation of the thimble 13 about its axis to form a bayonet connection. Thus when the floating piston 35 is pulled down, it will pull down the thimble 13. In order to prevent the tabs from rotating and disengaging from the groove 41 the spring 45 via the thimble lock 43 presses upon the under side of skirt 18. The spring 45 thus serves two functions; namely, urging the thimble 13 against the underside of the neck ring 11 during the full-up and blow modes and at all times urging the thimble 13 upward relative to the floating piston 35. Removable stops 51 extending from the floating piston 35 ride in slots 52 in the thimble lock 43 to restrict the uppermost travel of the thimble lock 43 while the thimble 13 is being exchanged and also to prevent rotation of the thimble lock 43 about its axis.

The downwardmost travel of the lock spring piston 42 relative to the floating piston 35 is controlled by the insertion of a removable spacer 60 that rides within the floating piston 35 on an interior radial surface at the lower end.

FIG. 1 illustrates the cartridge assembly in the blow mode or position. The floating piston 35 has the upper tapered end 36U seated in the tapered cylinder cap 24. The plunger 12 has been pulled down by the adapter 14 and piston rod 15. Note the space S1 between the plunger 12 and the thimble 13. The spring 45 has expanded to keep the thimble 13 pressed against the neck ring 11.

As shown in FIG. 1, the lock spring piston 42 rests upon the spacer 60 which, in turn, rests upon the lower end of the floating piston 35. Hence, further downward movement of the piston rod 15 will drag the floating piston 35, the plunger 12, and the thimble 13 away from the neck ring 11 to the full-down position collapsing the space S2. At this position, the lower tapered end 36L of the floating piston 35 will seat in the tapered recess in the lower stop 23. On the other hand, upward motion of the piston from this position will move the plunger 12 into the neck ring 11 collapsing the space S1 between the plunger 12 and the thimble 13.

In operation, the floating piston 35 is rammed up to the full-up position or is pulled down to the full-down position. When the floating piston 35 reaches either extreme position, it seats in a tapered recess. The energy and momentum of the floating piston 35 is dissipated both radially and axially due to the tapers whereas, with prior constructions, the entire energy and momentum had to be dissipated in the axial direction. Thus, the wear on the various machine elements due to the hammering action is diminished. The tapers provide another advantage. At each end of the motion of its travel, the floating piston 35 is axially aligned as the tapered ends thereof seat. To maintain this alignment throughout the travel of the floating piston 35 the lubricated bushings 55 and 56 ride on the inside of the barrel 22. Additionally, to further constrain the motion of the floating piston 35, the guide rods 26 riding in the bores 40 prevent rotation of the floating piston 35. Thus, the motion of the floating piston 35 is tightly controlled to avoid the wobble that resulted in wear and tear in prior art cartridge assemblies.

Most of the surfaces that slide relative to each other are supported by self-lubricating bushings 54, 55, 56, and 57. Hence, wear between surfaces is minimized and motion is smoother.

Having thus defined my invention in the detail and particularity required by the Patent Laws, what is desired protected by Letters Patent is set forth in the following claims.

The invention claimed is:

1. A cartridge assembly for a blow-and-blow parison-forming machine which interacts with other machine elements including a pneumatically-actuated hollow piston rod, an adapter threaded on the end of the piston rod, a plunger attached to the adapter, and a thimble that slides over the plunger, said cartridge assembly comprising:

a cylindrical barrel;

an annular lower stop having a central opening for accepting a piston rod and having an upwardly opening tapered recess adjacent the central opening and a first upwardly facing circular surface near the periphery of the lower stop;

an annular cylinder cap having a central opening for accepting the thimble and plunger and having a downwardly opening tapered recess adjacent the central opening;

said lower stop, cylinder cap, and barrel form a unit with the annular stop at the lower axial end of the barrel and the cylinder cap at the upper axial end of the barrel;

a first coil spring resting at the lower end thereof on the first upwardly facing circular surface in the lower stop;

an annular floating piston having a central bore for receiving the thimble, plunger, adapter, and piston rod, said floating piston arranged to reciprocate within the barrel, said floating piston having a lower tapered end for at the lowermost position of the floating piston resting in the upwardly opening tapered recess in the lower stop and an upper tapered end for at the uppermost position of the floating piston resting in the downwardly opening tapered recess in the cylinder cap, said floating piston having a first annular flange defining a first downwardly facing circular surface against which the upper end of the large coil spring rests;

an annular lock spring piston having a central opening receiving the piston rod and being captured between the piston rod and adapter, said lock spring piston having a cylindrical periphery slidable within said floating piston and a second upwardly facing circular surface near the periphery thereof;

a second coil spring resting at its lower end in the second upwardly facing circular surface in the lock spring piston; and an annular thimble lock having an exterior surface for sliding within the floating piston, an upwardly facing surface for abutting the thimble, and a second downwardly facing circular surface for receiving the upper end of the second spring.

2. The cartridge assembly according to claim 1, wherein at least one of the circular surfaces abutting coil springs is at the base of a groove.

3. The cartridge assembly according to claim 1, wherein the first and second upwardly facing cylindrical surfaces abutting coil springs are at the base of a groove.

4. The cartridge assembly according to claim 1, wherein first annular flange on the floating piston holds a self-lubricating bushing that slidably abuts the inside cylindrical surface of the barrel.

5. The cartridge assembly according to claim 4, wherein the floating piston further comprises a second annular flange axially spaced from and above the first annular flange and said second annular flange holds a self-lubricating bushing that slidably abuts the inside cylindrical surface of the barrel.

6. The cartridge assembly according to claim 1, wherein the first and second coil springs have rectangular cross sections.

7. The cartridge assembly according to claim 1, further comprising guide rods secured in the lower stop parallel to the axis of the barrel and said floating piston has parallel bores therein for slidably receiving said guide rods.

8. The cartridge assembly according to claim 1, wherein the lower end of the floating piston adjacently surrounds the piston rod and holds a self-lubricating bushing sliding over the piston rod.

9. The cartridge assembly according to claim 1, wherein the lock spring piston holds a self-lubricating bushing on the cylindrical periphery thereof.

10. The cartridge assembly according to claim 1, wherein the lower stop and cylinder cap are removably fastened to the barrel.

* * * * *